(12) United States Patent
Clute et al.

(10) Patent No.: US 6,749,225 B1
(45) Date of Patent: Jun. 15, 2004

(54) SAFETY BELT SYSTEM WITH PRE-TENSIONING DEVICE FOR SECONDARY COLLISION

(75) Inventors: Günter Clute, Hamburg (DE); Alois Juchem, Sa (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/485,055
(22) PCT Filed: Jul. 17, 1998
(86) PCT No.: PCT/EP98/04458
§ 371 (c)(1), (2), (4) Date: May 22, 2000
(87) PCT Pub. No.: WO99/06249
PCT Pub. Date: Feb. 11, 1999

(30) Foreign Application Priority Data

Jul. 29, 1997 (DE) .......................... 197 32 453

(51) Int. Cl.⁷ .......................... B60R 22/46; B65H 75/48
(52) U.S. Cl. .................................... 280/806; 242/379.1
(58) Field of Search .......................... 280/801.1, 806, 280/807, 808; 297/480, 476; 242/374, 379.1

(56) References Cited

U.S. PATENT DOCUMENTS

| | | | | |
|---|---|---|---|---|
| 2,880,815 A | * | 4/1959 | Apfelbaum | 280/805 |
| 3,765,700 A | * | 10/1973 | Littmann | 297/476 |
| 3,957,281 A | | 5/1976 | Pech | |
| 4,166,642 A | * | 9/1979 | Jahn et al. | 280/806 |
| 4,884,825 A | * | 12/1989 | Grunewald et al. | 280/806 |
| 4,949,995 A | * | 8/1990 | Haland et al. | 280/806 |
| 5,149,133 A | * | 9/1992 | Alvarado | 280/804 |
| 5,265,813 A | * | 11/1993 | Fohl | 280/806 |
| 5,358,274 A | * | 10/1994 | Watanabe | 280/808 |
| 5,443,222 A | * | 8/1995 | Modinger et al. | 242/374 |
| 5,476,287 A | * | 12/1995 | Lichtwardt | 280/806 |
| 5,516,199 A | * | 5/1996 | Crook et al. | 297/476 |
| 5,522,564 A | * | 6/1996 | Schmidt et al. | 242/374 |
| 5,553,803 A | * | 9/1996 | Mitzkus et al. | 280/806 |
| 5,566,978 A | * | 10/1996 | Fleming et al. | 280/806 |
| 5,580,091 A | * | 12/1996 | Doty | 280/805 |
| 5,615,917 A | * | 4/1997 | Bauer | 280/806 |
| 5,660,347 A | * | 8/1997 | Baker | 242/379.1 |
| 5,743,481 A | * | 4/1998 | Baker | 280/806 |
| 5,788,176 A | * | 8/1998 | Ebner et al. | 242/374 |
| 5,842,344 A | * | 12/1998 | Schmid | 242/374 |

FOREIGN PATENT DOCUMENTS

| | | |
|---|---|---|
| DE | 2 234 246 | 1/1974 |
| DE | 43 31 027 A1 | 3/1995 |
| EP | 0 297 537 A2 | 1/1989 |
| WO | 97/06992 | 2/1997 |
| WO | 97/27088 | 7/1997 |

OTHER PUBLICATIONS

Patent Abstracts of Japan 60104437.

* cited by examiner

*Primary Examiner*—Eric Culbreth
*Assistant Examiner*—Joselynn Y Sliteris
(74) *Attorney, Agent, or Firm*—R W Becker & Associates; R W Becker

(57) ABSTRACT

A safety belt arrangement is provided that has a belt retractor that includes a force-limiting device. When triggered in a collision, the belt retractor is associated with limited belt release therefrom. Associated with the belt retractor is a tensioning device that is actuated subsequent to the primary collision and that eliminates slack in a belt that occurs when the force-limiting device is triggered during the primary collision.

12 Claims, 11 Drawing Sheets

SAFETY BELT SYSTEM WITH PRE-TENSIONING DEVICE FOR SECONDARY COLLISION

BACKGROUND OF THE INVENTION

The invention relates to a safety belt arrangement with a belt retractor comprising a force-limiting device that, when triggered in a collision, is associated with a limited release from the blocked retractor.

A generic safety belt arrangement is known from DE 43 31 027 A1. In it, the belt retractor is provided with a force-limiting device that in particular when cooperating with an airbag causes the intentional release of the belt in a controlled manner while simultaneously reducing the force peaks that occur during a collision. If subsequent to such a first collision (primary collision) there is a second collision, e.g. in a multi-vehicle collision, the slack in the belt created by the force-limiting device in the primary collision is disadvantageous because the triggered safety belt no longer holds the occupant wearing the safety belt securely enough.

The object of the invention is therefore to further develop a safety belt arrangement of the type specified in the foregoing so that the person wearing the safety belt is securely restrained even in a second collision subsequent to the primary collision.

SUMMARY OF THE INVENTION

This object is achieved, including advantageous embodiments and further developments of the invention, from the contents of the patent claims that follow this specification.

The main idea behind the invention is that associated with the belt retractor is a tautening or tensioning device that is actuated subsequent to the primary collision and that eliminates the slack in the belt that occurs when the force-limiting device is triggered during the primary collision. The invention is associated with the advantage that, despite the slack in the belt necessarily associated with the force-limiting process in a primary collision, the person wearing the belt is securely restrained if there is a second collision because the slack in the belt that is created during the primary collision is immediately eliminated by the additional tensioning apparatus provided in accordance with the invention.

In a first embodiment the invention provides that the tensioning device constitutes an energy accumulator that can be loaded by the rotation of the belt winding shaft in the direction of the belt's release while the force-limiting device is being triggered, whereby the loadable energy accumulator can especially constitute a tensible spring. Alternative energy accumulators, e.g. in the form of air compression, are also conceivable. This results in the advantage that an additional tensioning apparatus of this type is integrated into the retractor and simultaneously in particular false triggering is not possible because the energy to be stored in the tensioning apparatus is not built up until the force-limiting device is actuated. It can furthermore be provided that the untensed spring is connected to the belt winding shaft and its free spring end can be caused to engage with a stop attached to the housing when the force-limiting device is triggered so that the spring is tensed by the rotation of the belt winding shaft in the direction of the belt's release, said rotation occurring when a force is limited.

When in accordance with the generic DE 43 31 027 A1 the force-limiting device comprises a torsion bar that is blockably tensed on one side and that at the other end is joined to the winding shaft and the winding shaft is rotatable relative to the tensioning of the torsion bar while the force-limiting device is being triggered, the rotation of the winding shaft is advantageously used for tensing the spring constituting the tensioning device in that a lever arrangement is provided that is arranged between a shaft axis and the free spring end, that in its neutral position holds the spring end free, and that can be moved by the relative movement between the winding shaft and the tensioning of the torsion bar in an extended position that effects engagement of the spring end with the stop attached to the housing.

In a generic belt retractor, in which in the interior of the shaft body of the winding shaft is arranged a shaft casing that is joined on one side to the torsion bar and that can be fixed via the blocking system of the retractor and that encloses the torsion bar, such a lever arrangement can be arranged such that a first lever is borne on the shaft axis and is fixed to the shaft casing via a shearing pin and a second lever guiding the spring end is joined to the first lever and is deflectably arranged via a link guide embodied between the shaft body and the second lever radially outward until it engages the spring end held by the second lever at the stop attached to the housing.

If, in another embodiment of the safety belt arrangement, the force-limiting device comprises a torsion bar joined at its one end to the winding shaft and at its other end connected to a profiled head as carrier of the blocking member and the winding shaft is rotatable relative to the profiled head while the force-limiting device is being triggered, as an alternative to the lever arrangement an apparatus for tensing the spring can be provided that constitutes the tensioning apparatus in which apparatus the spring end is held at a gearwheel movably arranged via a control link at the torsion bar due to the relative movement between the winding shaft and the torsion bar until it engages in a toothed member attached to the housing, whereby the rotation of the winding shaft in the direction of the belt's release during the force-limiting process tenses the spring via rolling of the gearwheel on the toothed member attached to the housing.

An alternative embodiment of the invention has as its subject a tensioning apparatus arranged outside the retractor, in which tensioning apparatus a drive energy for the secondary tensioning apparatus is to be maintained. In a corresponding exemplary embodiment of the invention it is provided that the retractor is fastened to a movable slide member on a track attached to the vehicle and the tensioning device is embodied as a drive apparatus that acts on the slide member and that eliminates the slack in the belt caused when the slide is displaced with the retractor during a primary collision and that is triggerable subsequent to the primary collision. Depending on the strength of the tensioning apparatus, in addition to eliminating the slack in the belt, the body of an occupant who is, e.g., bent forward can be returned. In accordance with exemplary embodiments of the invention, the drive apparatus can be embodied as pretensed compression springs that drive the slide member when triggered or alternatively as a drive apparatus that acts pyrotechnically on the slide member.

Finally, the retractor used in the safety belt arrangement, in addition to being joined to the force-limiting device, can also be joined to a tensioning apparatus for the primary collision, as described in the generic DE 43 31 027, so that two tensioning devices are available in such an embodiment of the invention, and these are one tensioning device for the primary collision and one tensioning device for the secondary collision that is activated by the force-limiting function.

BRIEF DESCRIPTION OF THE DRAWING

Exemplary embodiments are illustrated in the drawings and described in more detail in the following.

DESCRIPTION OF PREFERRED EMBODIMENTS

Figure 1:
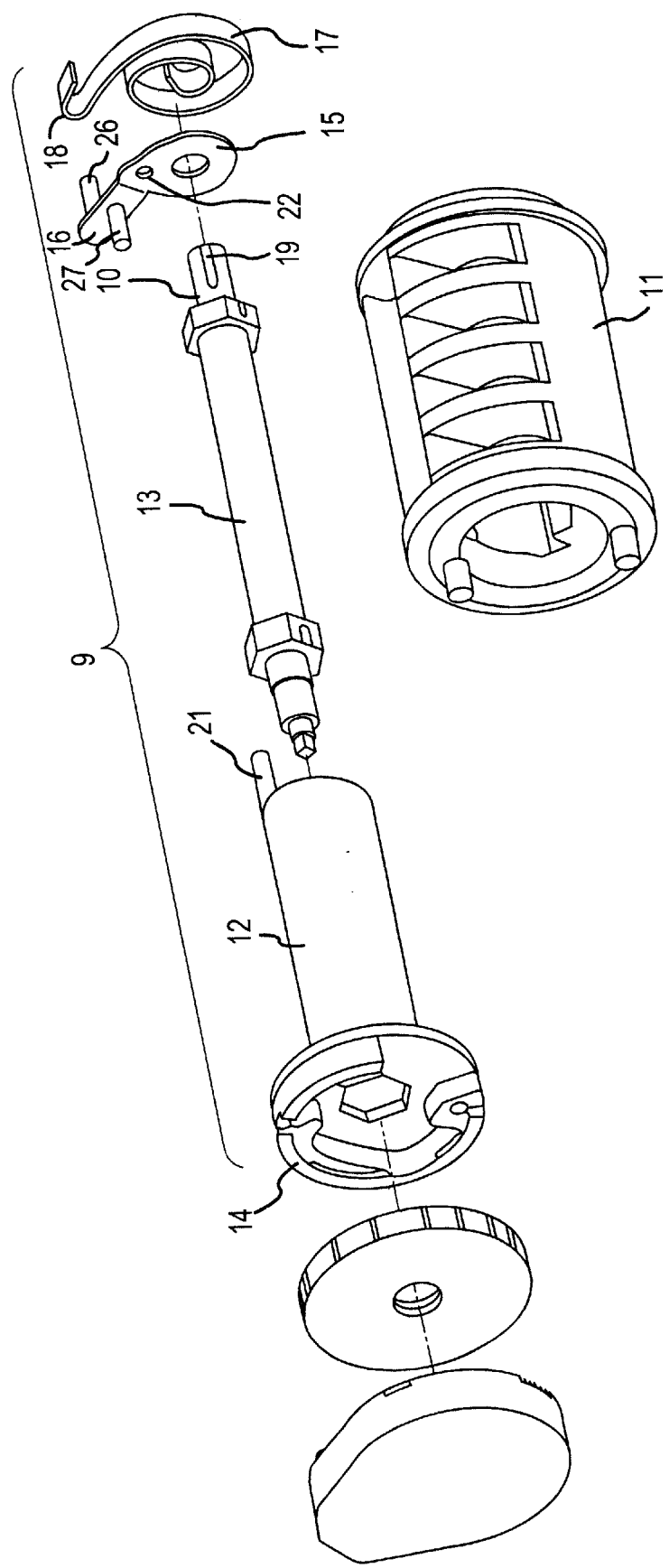
FIG. 1 is an exploded view of the arrangement of the winding shaft of a safety belt with a tautening device, in the form of a winding spring effective when putting a safety belt on and off, coupled to the winding shaft that is actuated prior to a primary collision and a force-limiting device and associated tensioning apparatus that is actuated following a primary collision.

FIG. 1 illustrates the individual components of a winding shaft 9 in which arranged on a shaft axis 10 is a torsion bar 13 that is joined at its one end in a positive fit to a shaft casing 12 fitted over the torsion bar 13 and that is joined at its other end in a positive fit to a shaft body 11 fitted over the shaft casing 12, on which shaft body 1 the safety belt (not shown) is wound. At its end that forms the connection to the torsion bar 13, the shaft casing 12 forms a blocking side 14 for connecting to the blocking system (not shown) of the safety belt retractor.

Borne on the side on the shaft axis 10 facing away from the blocking side 14 is a first lever 15 that is loosely joined to a second lever 16; in addition to the lever arrangement 15, 16, fitted on the shaft axis 10 is a spring 17 for a secondary tensioning apparatus that is fixed at its inner end in a slot 19 in the shaft axis 10 and the outer spring end 18 of which terminates in a crook. As can be seen from FIGS. 2 and 2a, the lever 16 has a guiding function for the spring end 18. The lever 16 has a first pin 26 that engages the spring end 18, that guides it [the spring end], and that is axially spaced from the shaft axis 10. On its opposing side, the lever 16 is guided in an associated slot 28 of the shaft body 11 via a second axial pin 27. In order to maintain the secondary tensioning apparatus in the form of the spring 17 in the neutral position during normal operation of the retractor, the first lever 15 is fixed by means of a recess 22 embodied thereon to a shearing pin 21 that is arranged on the shaft casing 12 and that extends through the shaft body 11 into an associated guide slot 29.

Figure 2:
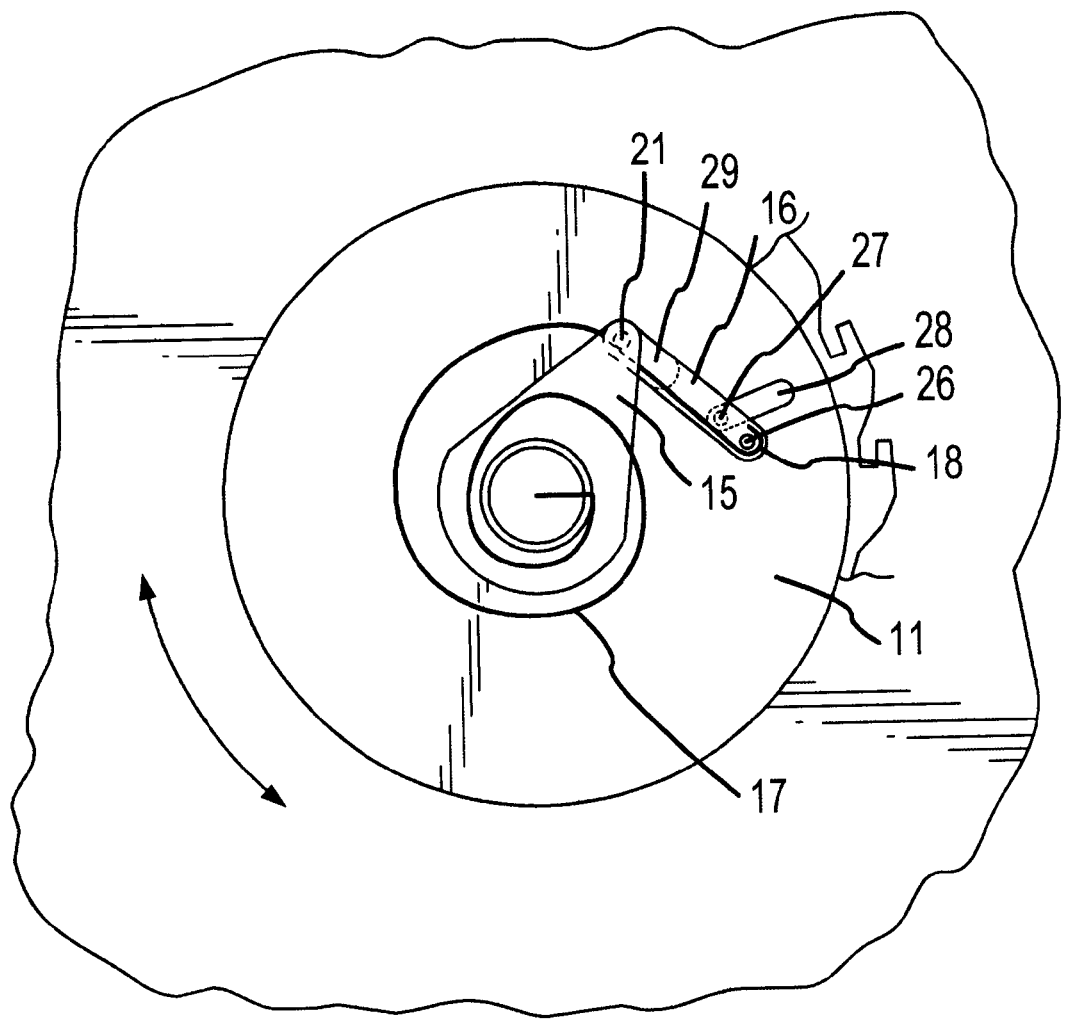
FIG. 2 is a detailed illustration of an end view of the winding shaft with a spring constituting the tensioning apparatus in its neutral position.
Figure 2A:
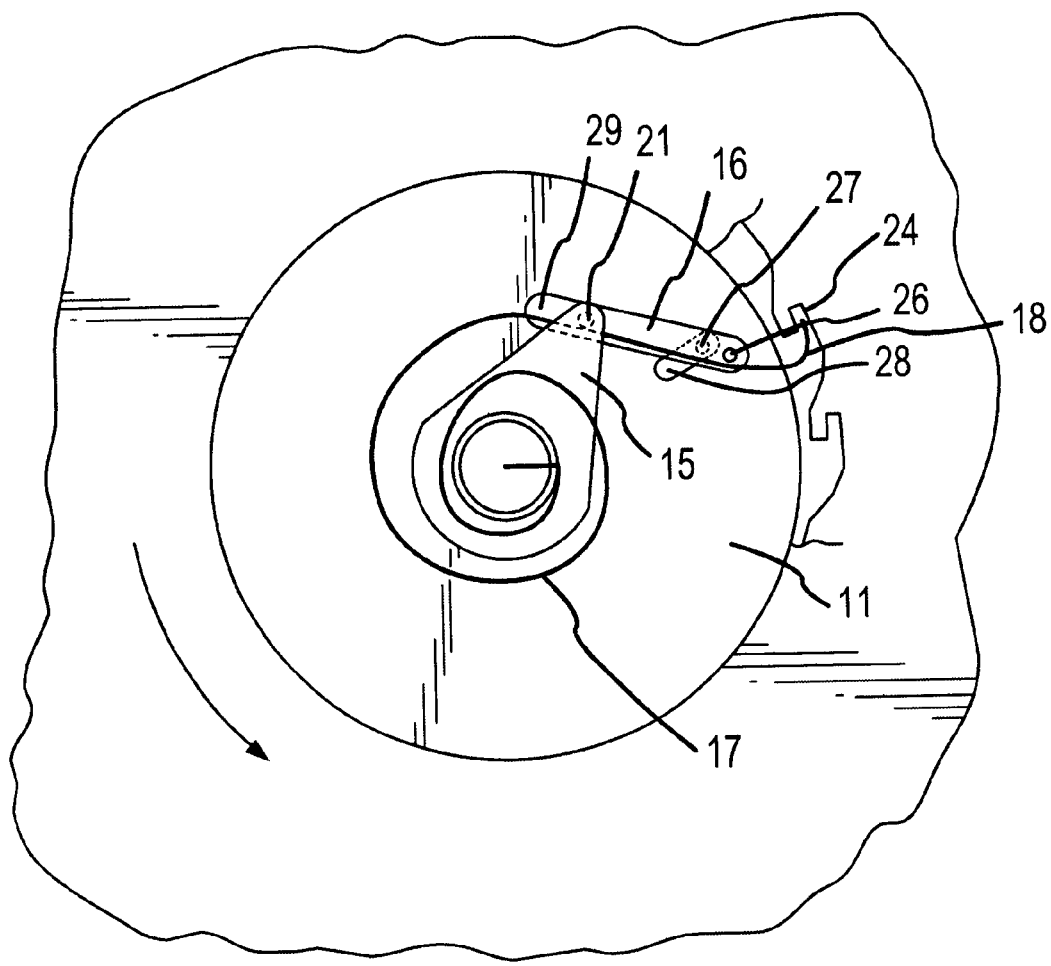
FIG. 2a is the subject of FIG. 2 with a coupled spring.

As can be seen in detail in FIG. 2, during normal operation of the retractor the shaft body 11 carries the lever arrangement 15, 16 with it via the shearing pin 21, so that the shaft body 11 rotates freely when the spring 17 is relaxed.

When the safety belt retractor is blocked, the profile head 14 is fixed with the shaft casing 12 and the shearing pin 21 seated thereon via the engagement of the blocking member (not shown) so that due to the pull on the safety belt wound on the shaft body 11 and due to the connection that exists at the end opposing the profiled head 14 between the shaft body 11 and the torsion bar 13 there is a further counter-clockwise rotation of the shaft body 11 and thus the shaft body 11 rotates relative to the shaft casing 12.

Due to the pin/slot connection 27, 28, the relative rotation between the shearing pin 21 and the shaft body 11 via the pin 27 conducts and deflects the second lever 16 outward radially such that it carries via its first pin 26 the spring end 18 of the spring 17. Once the spring end 18 projects far enough over the exterior diameter of the shaft body 11, during the further rotational movement of the shaft body 11 it [the spring end] catches on one of the stops 24 that is attached to the housing. During the further rotation of the shaft body 11 relative to the shaft casing 12, the shearing rod 21 shears off once it has reached its final position in the slot 29 so that the spring 17 is tensed via the continuing rotation of the shaft body 11 during the force-limiting process. This means that a drive energy for the return rotation of the winding shaft 9 is available after the primary collision for eliminating the slack in the belt that resulted due to the actuation of the force-limiting device.

Figure 3:
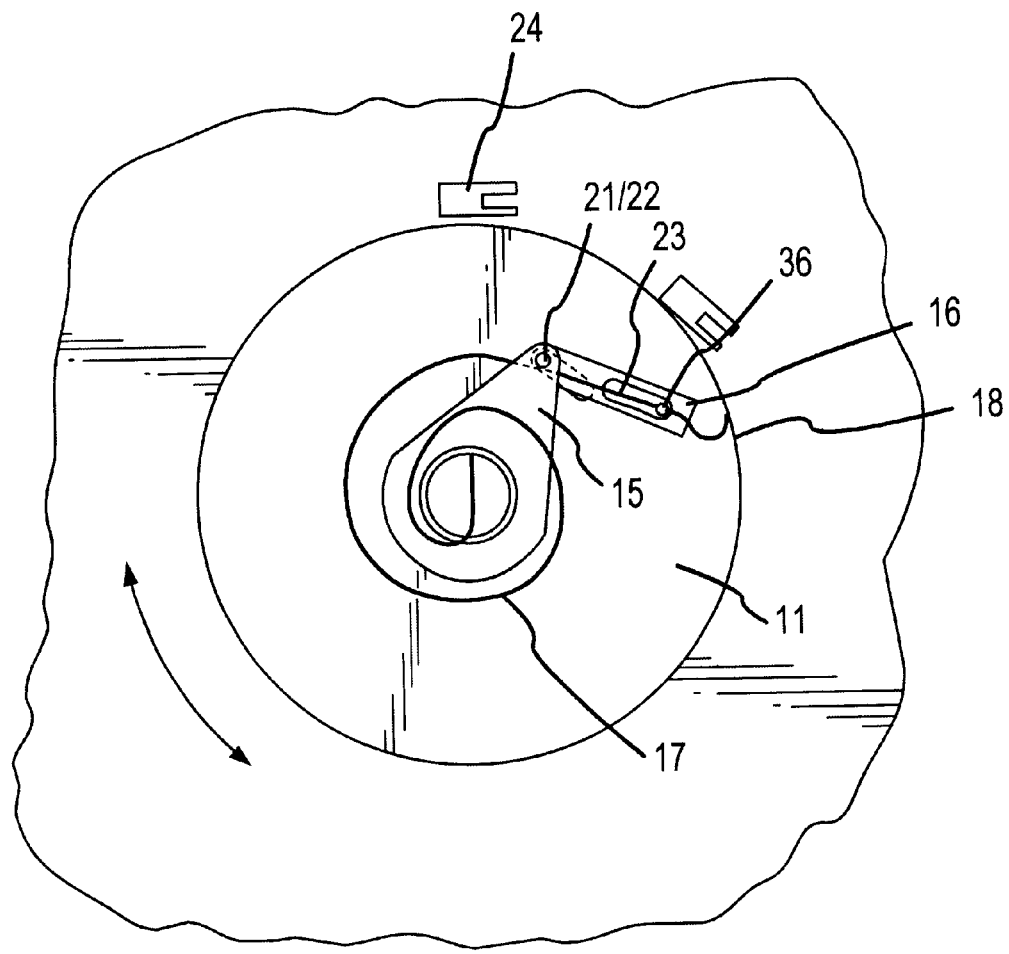
FIG. 3 is another exemplary embodiment with a spring constituting the tensioning apparatus corresponding to FIG. 2.
Figure 3A:
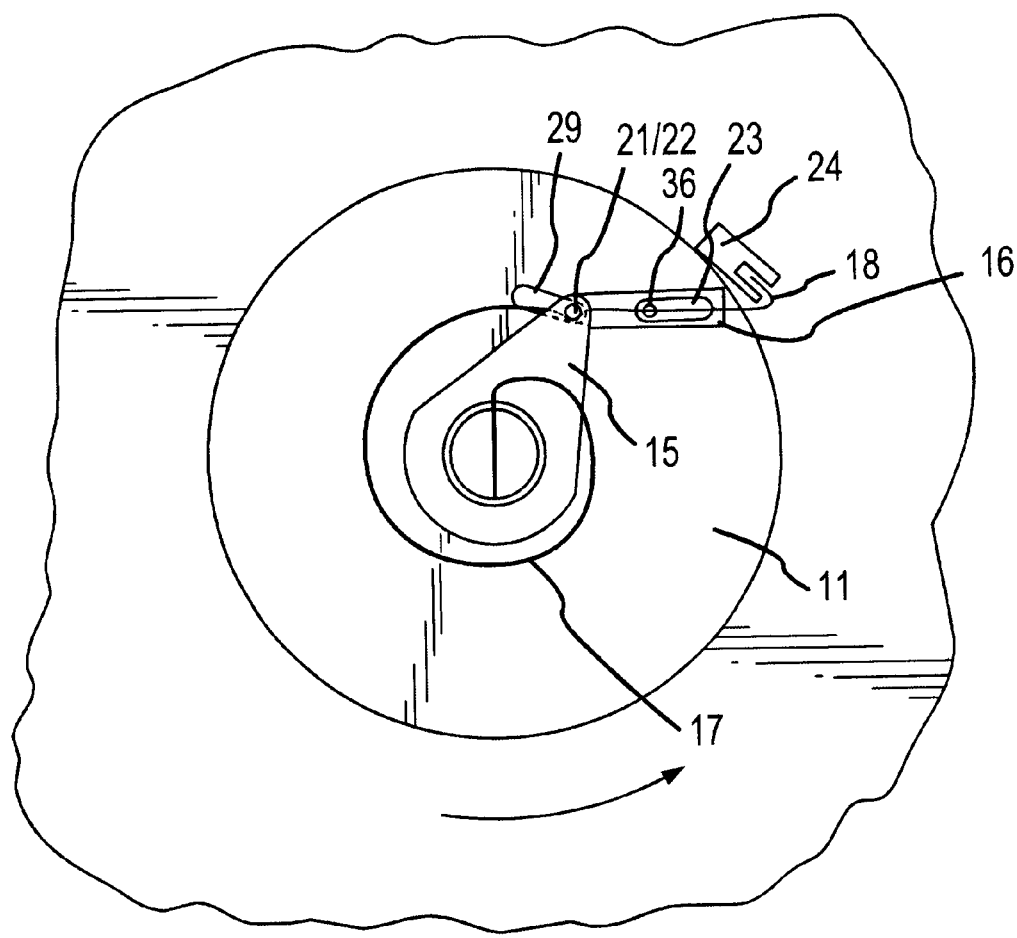
FIG. 3a is the subject of FIG. 3 with a coupled spring end.

The exemplary embodiment illustrated in FIGS. 3 and 3a is distinguished from the exemplary embodiment described in the foregoing (FIGS. 2, 2a) in terms of construction and function in that the pin 26 is omitted and the spring end 18 is guided by means of a peg 36 seated thereon in a longitudinal slot 23 arranged in the lever 16 so that the radial movement of the lever 16 leads to a linear expulsion of the spring end 18 over the circumference of the shaft body 11 until it engages at the stop 24 attached to the housing.

Figure 4A:
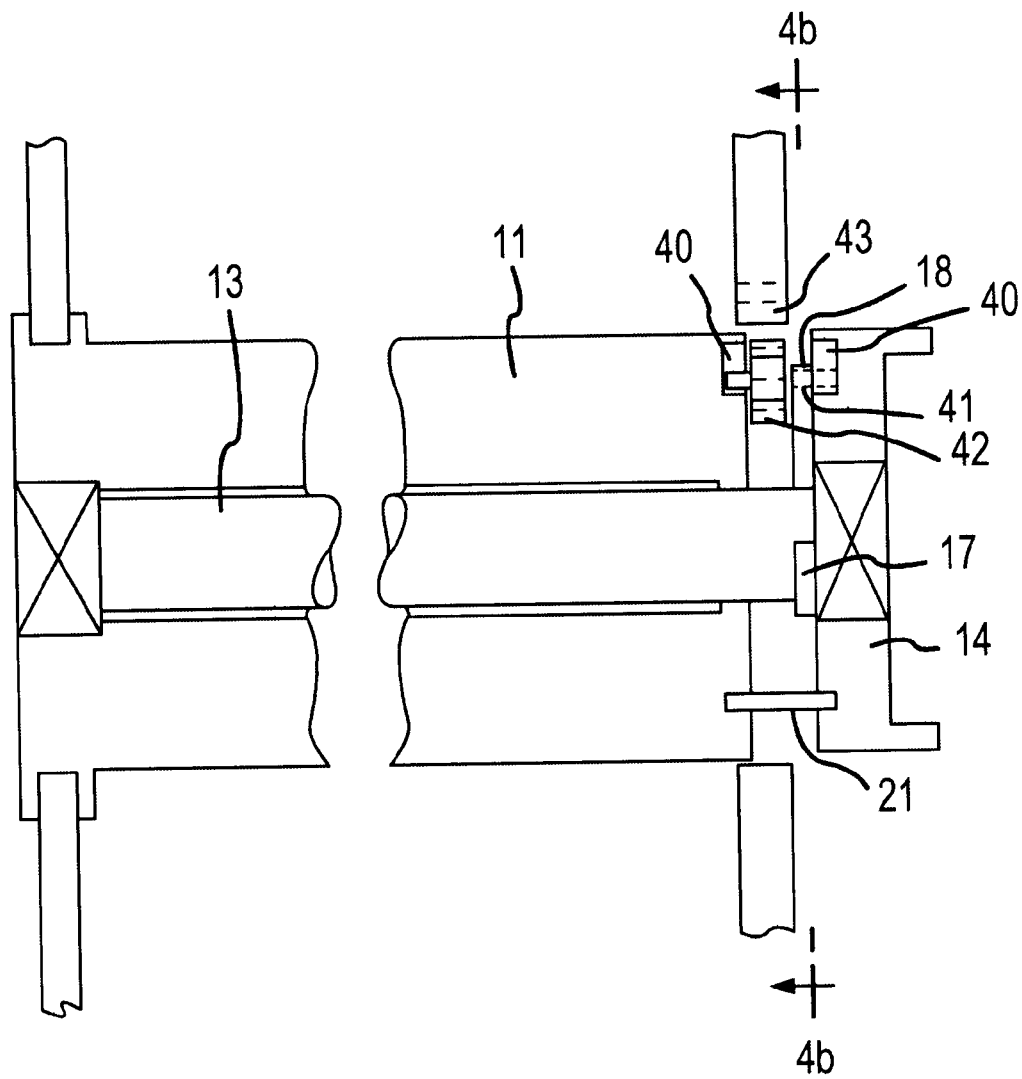
FIG. 4a is a side elevation of another exemplary embodiment with a gearwheel for a drive for tensing the spring that constitutes the tensioning apparatus.
Figure 4B:
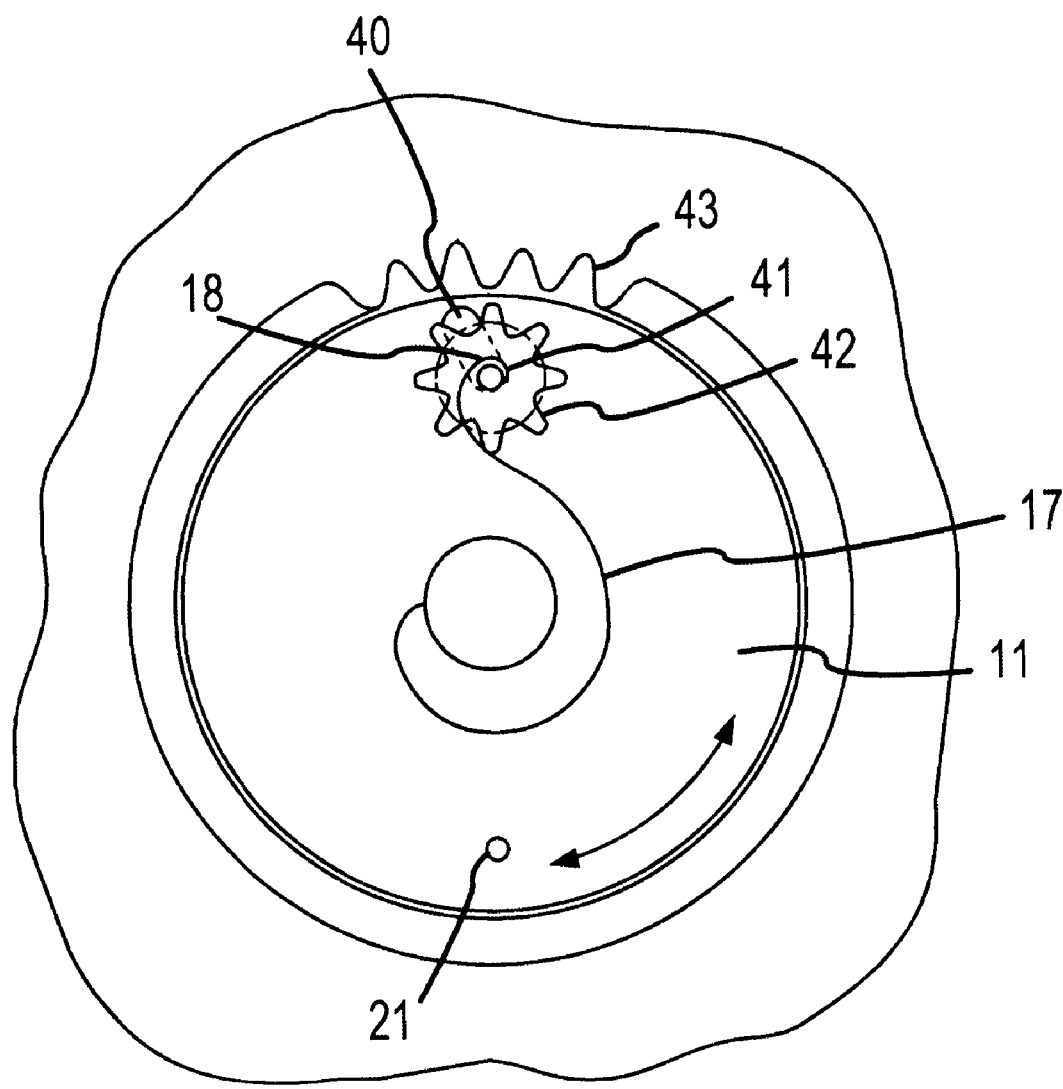
FIG. 4b is an end view of the subject of FIG. 4a with the spring in the neutral position.
Figure 4C:
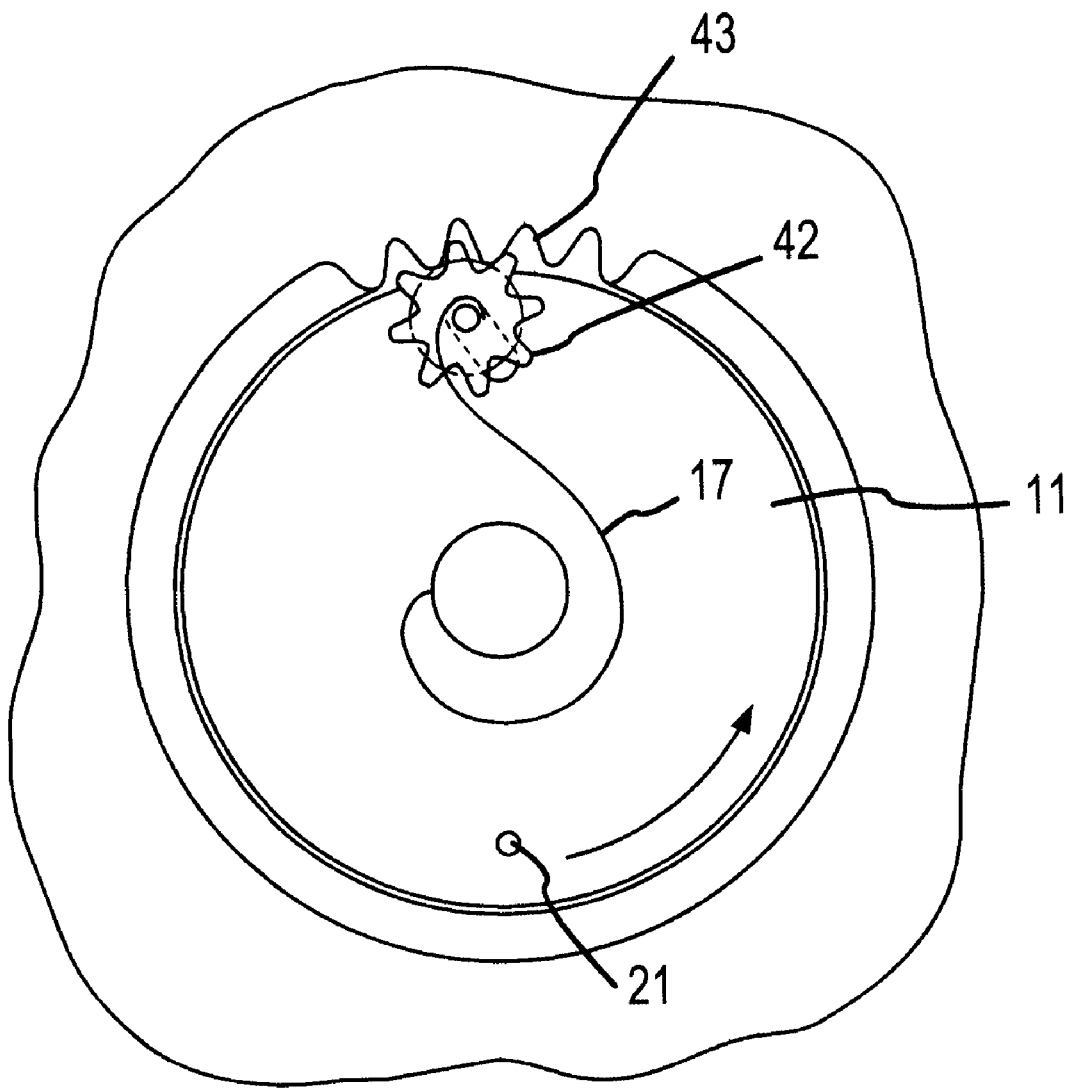
FIG. 4c illustrates the subject of FIG. 4b while the spring is tensed.

In the exemplary embodiment illustrated in FIGS. 4a through 4c, the secondary tensioning apparatus is arranged in the form of the spring 17 between the profiled head 14 and the shaft body 11 so that in this embodiment there is no shaft casing 12.

As can be seen in detail from FIG. 4a, the spring 17 is arranged between the end face of the shaft body 11 and the profiled head 14, whereby for adjusting the normal operation the shaft body 11 and the profiled head 14 are joined via the associated shearing pin 21. A shaft 41 carrying a gearwheel 42 is movably mounted in the guide slots 40 that are arranged mutually opposing on the profiled head 14 and on the end of the shaft body 11 and that are disposed radially outward in mutual opposition.

In the neutral position, which can be seen in FIG. 4b, the gearwheel 42 is situated inside the contour of the shaft body 11, so that the shaft body 11 can rotate in both directions of rotation without the spring 17 being tensed. Once the profile head 14 has been blocked by the blocking member (not shown) and by the shearing rod 21 having been sheared off, the relative rotation between the shaft body 11, which continues to rotate while the force-limiting device is effective, and the fixed profiled head 14 causes the gearwheel 42 to move radially outward until it engages in the toothed member 43 fixed to the housing. As the shaft body 11 continues to rotate relative to the profiled head 14, the end of the shaft 41 situated in the profiled head 14 is sheared off so that the further rolling of the gearwheel 42 on the toothed member 43 fixed to the housing causes the spring 17 to tense via the further rotation of the shaft body.

Figure 5:
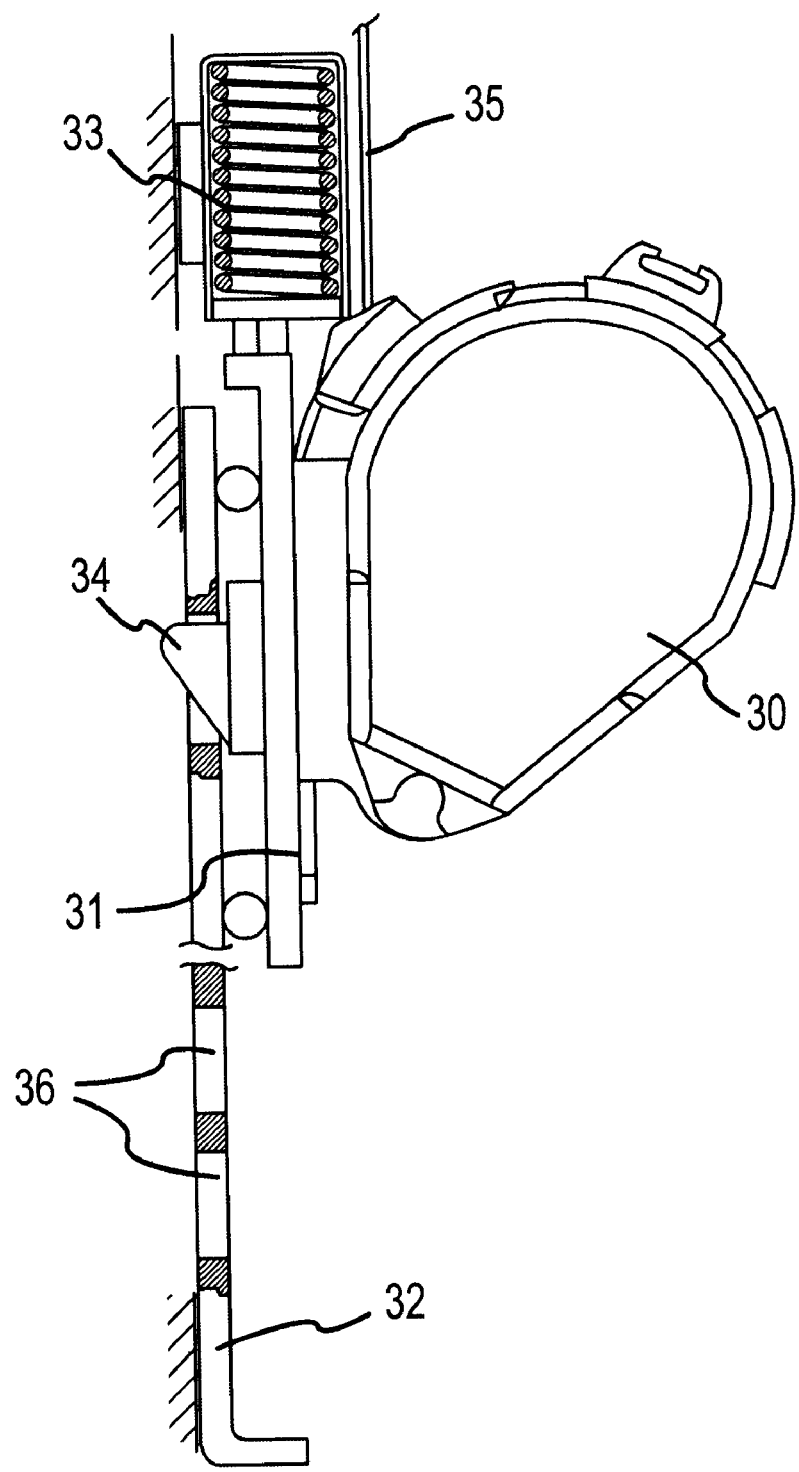
FIG. 5 is a partial cut-away of another embodiment with an externally arranged tensioning apparatus that acts on the retractor.
Figure 5A:
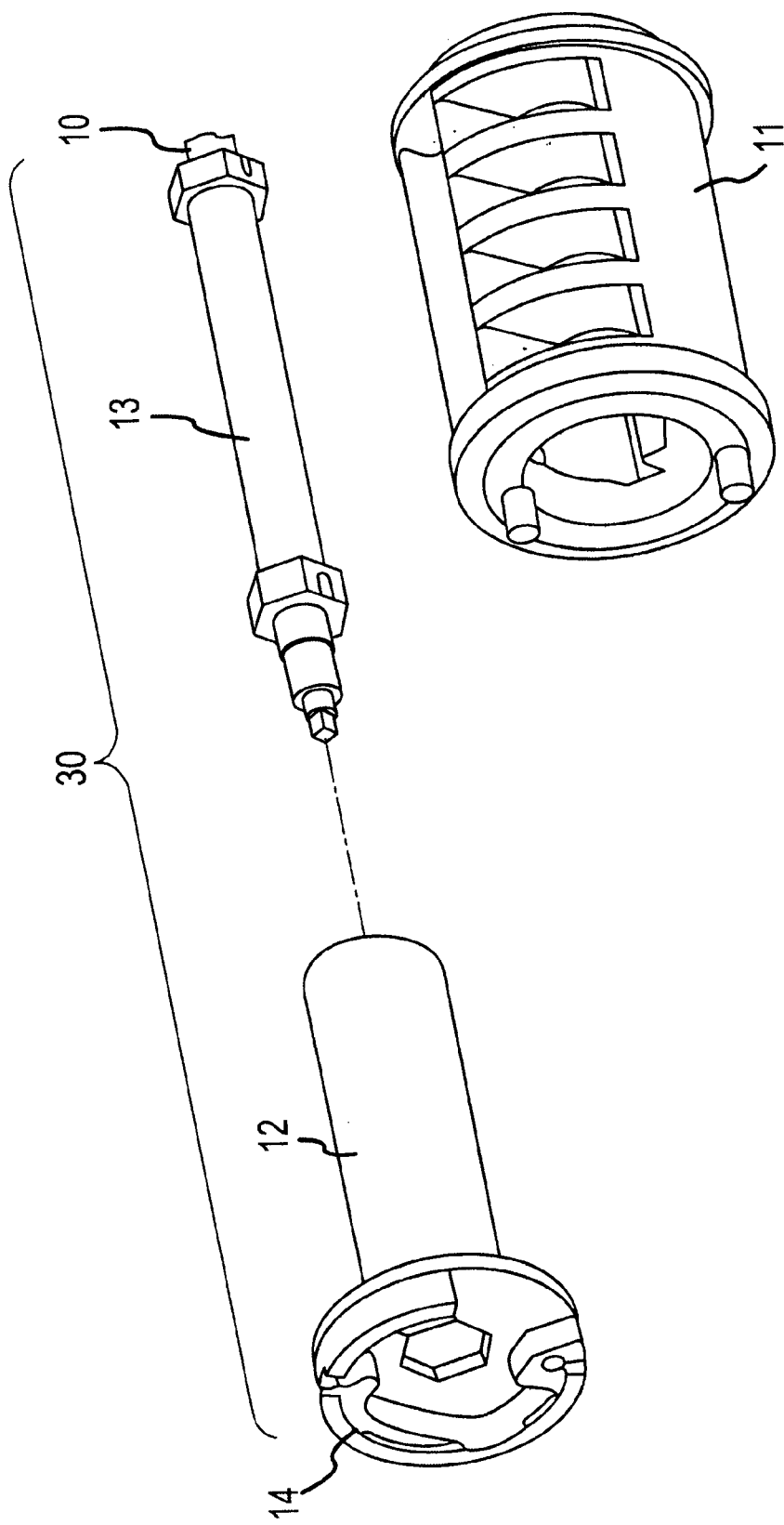
FIG. 5a is an exploded perspective view of the embodiment shown in FIG. 5 and showing, in particular, details of the retractor.
Figure 5B:
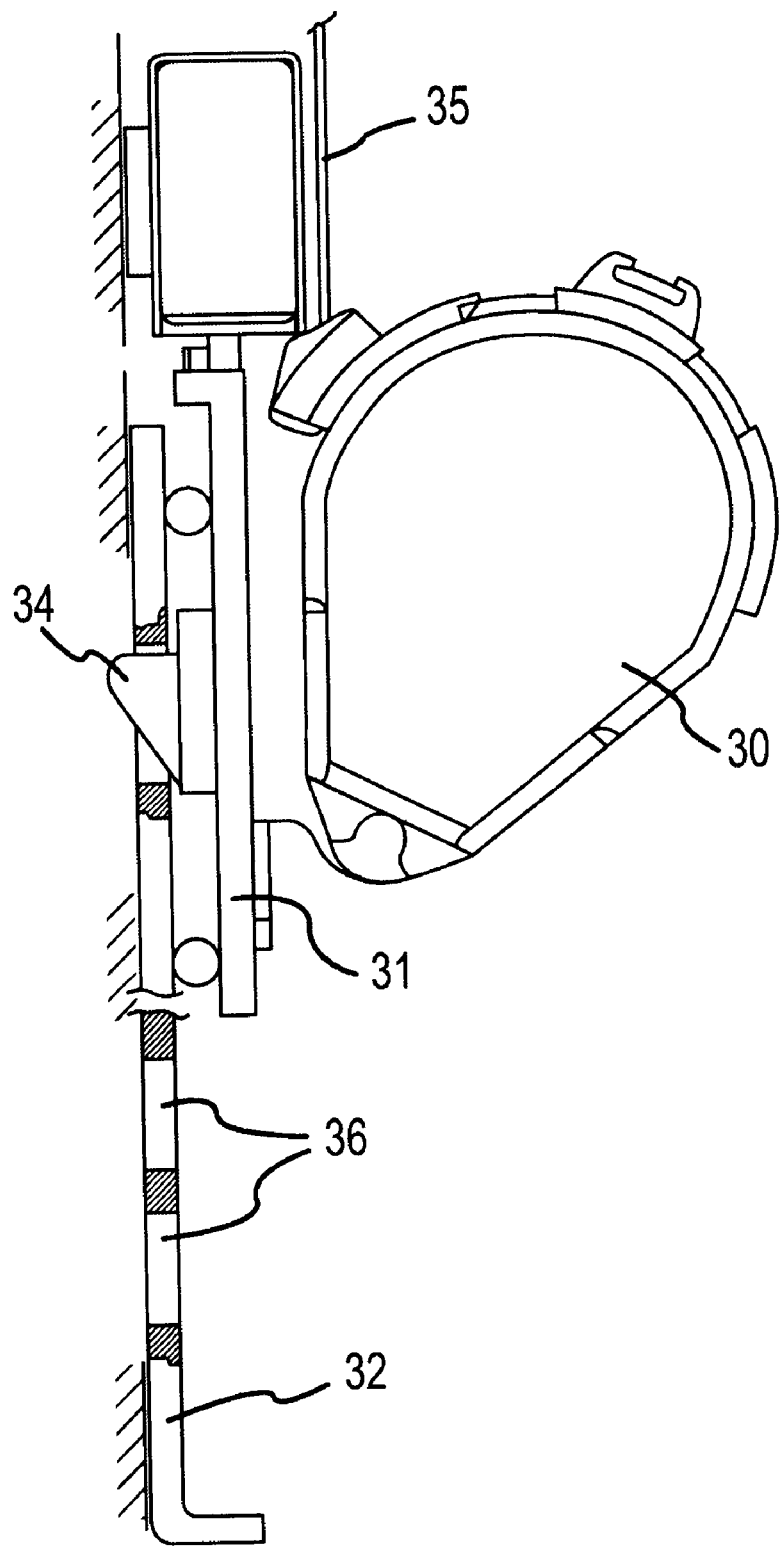
FIG. 5b is a partial sectional view of a modification of the embodiment shown in FIG. 5 and showing a pyrotechnic drive device with a corresponding housing, from which a piston is withdrawable with this piston being connected with the slide so that the belt roller can be correspondingly moved.

FIG. 5 illustrates another embodiment of the invention in which the secondary tensioning apparatus is arranged outside the safety belt retractor. A safety belt retractor 30 is affixed to a slide 31 that is movable on a track 32 that is attached to the vehicle. Associated with the slide 32 is a tensed compression spring 33 as a drive apparatus; it can be triggered subsequent to a primary collision via a suitable control. The compression spring 33 acts on the slide 31 so that the retractor 30 is locked by the accelerated movement of the retractor and the belt strap 35 is tautened and the slack in the belt that occurs during the course of the primary collision is thus eliminated. Subsequent to this tautening or tensioning movement the slide 31 locks with the track 32 attached to the vehicle by means of a provided catch 34 (nose, recesses 36).

It is also possible to provide a pyrotechnic drive apparatus as an alternative to the pre-tensed compression spring 33 (not further illustrated).

The features of the subject of this document that are disclosed in the foregoing specification, in the patent claims, and in the abstract and drawings can be essential individually and in any desired combination for realizing the invention in its various embodiments.

The specification incorporates by reference the disclosure of German priority document 197 32 453.3 of Jul. 29, 1997 and European priority document PCT/EP98/04458 filed Jul. 17, 1998.

The present invention is, of course, in no way restricted to the specific disclosure of the specification and drawings, but also encompasses any modifications within the scope of the appended claims.

What is claimed is:

1. A safety belt arrangement having a belt retractor that includes a torsion bar as a force-limiting device, said safety belt arrangement further comprising:
   a tensioning device that is also associated with said belt retractor and that is actuated subsequent to a primary collision, wherein said tensioning device eliminates the slack in a safety belt that occurs when said torsion bar is triggered during a primary collision.

2. A safety belt arrangement according to claim 1, wherein said belt retractor comprises a belt winding shaft, and wherein said tensioning device is an energy accumulator that can be loaded by rotation of said belt winding shaft in a belt release direction during triggering of said force-limiting device.

3. A safety belt arrangement according to claim 2, wherein said energy accumulator is formed by a spring that can be tensioned.

4. A safety belt arrangement according to claim 3, wherein said spring in a non-tensioned state, is connected to said belt winding shaft, wherein when said force-limiting device is triggered, a free end of said spring is adapted to engage a stop of a housing so that said spring is tensioned by rotation of said belt winding shaft in a belt release direction, said rotation occurring during force limitation.

5. A safety belt arrangement according to claim 4, wherein said force-limiting device is a torsion bar that at one end is adapted to be blocked and that at another end is connected to said belt winding shaft, which is rotatable relative to tensioning of said torsion bar while said force-limiting device is being triggered, and wherein engagement of said spring with said housing stop is adapted to be induced by relative movement between said winding shaft and said tensioning of said torsion bar.

6. A safety belt arrangement according to claim 5, wherein a lever arrangement is provided that is disposed between an axis of said belt winding shaft and said free spring end, wherein in a neutral position said lever arrangement holds said spring end free, and wherein said lever arrangement, by relative movement between said belt winding shaft and said tensioning of said torsion bar, can be moved into an extended position that effects engagement of said spring end with said housing stop.

7. A safety belt arrangement according to claim 6, wherein a shaft casing is disposed in an interior of a shaft body of said belt winding shaft, wherein one side of said shaft casing is connected to said torsion bar and can be fixed in position via a blocking system of said belt retractor, wherein said shaft casing surrounds said torsion bar, wherein said lever arrangement comprises a first lever disposed on said shaft axis and fixed to said shaft casing via a shearing pin, wherein said lever arrangement comprises a second lever that guides said spring end and is connected to said first lever, and wherein said second lever is deflectably disposed by means of a slotted guide means that is formed between said shaft body and said second lever such that said second lever is deflectable radially outwardly until engagement of said spring end, which is held by said second lever, at said housing stop.

8. A safety belt arrangement according to claim 3, wherein said force-limiting device comprises a torsion bar that is connected at one end to said belt winding shaft and that is connected at another end to a profiled head that serves as a carrier for a blocking member, wherein said belt winding shaft is rotatable relative to said profiled head while said force-limiting device is being triggered, wherein a toothed member is provided on a housing, wherein a gearwheel is movably disposed via a control guide such that due to relative movement between a shaft body of said belt winding shaft and said profiled head said gearwheel engages said toothed member, wherein an end of said spring is held at said gearwheel, and wherein rotation of said shaft body in a belt release direction during a force-limiting process tensions said spring via rolling of said gearwheel on said toothed member.

9. A safety belt arrangement according to claim 1, which includes a slide member that is moveable on a track of a vehicle, wherein said belt retractor is secured to said slide member, and wherein said tensioning device is embodied as a drive apparatus that acts on said slide member and eliminates slack in a belt when said slide member is displaced with said belt retractor by said drive apparatus, and wherein said drive apparatus is adapted to be triggered after said primary collision.

10. A safety belt arrangement according to claim 9, wherein said drive apparatus is embodied as a pre-tensioned compression spring that drives said slide member when triggered.

11. A safety belt arrangement according to claim 9, wherein a pyrotechnic drive apparatus is provided that acts on said slide member with said belt retractor.

12. A safety belt arrangement according to claim 2, wherein said belt retractor is provided with a further tensioning device that is adapted to be coupled with said belt winding shaft and that is actuated prior to said primary collision.

\* \* \* \* \*